Patented July 20, 1926.                                              1,593,172

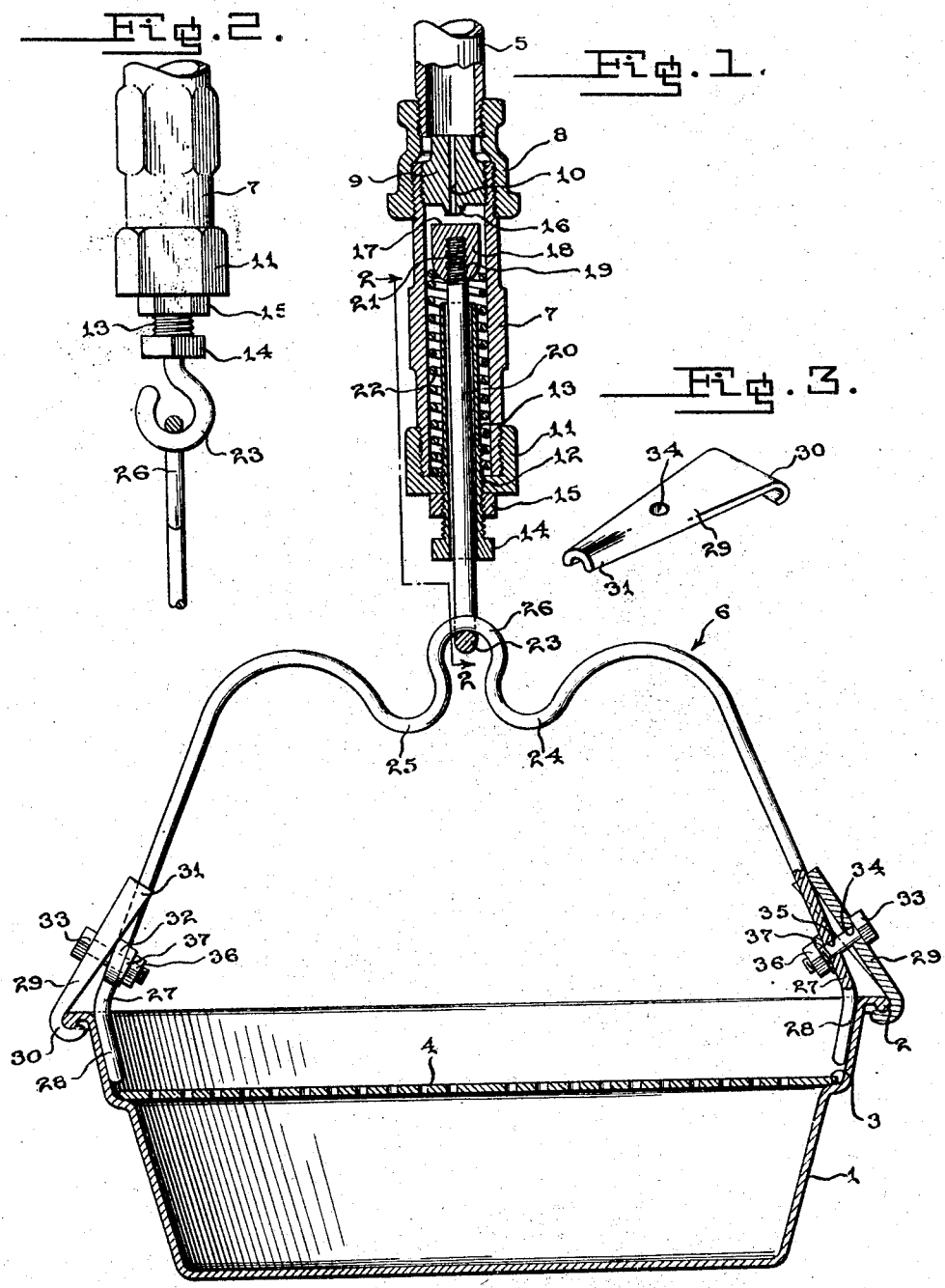

UNITED STATES PATENT OFFICE.

MARK W. HEATHERINGTON, OF ORLANDO, FLORIDA.

POULTRY FOUNTAIN.

Application filed August 1, 1925. Serial No. 47,512.

My invention relates to improvements in drinking fountains for poultry, and it consists in the combinations, constructions and arrangements herein described and claimed.

An object of the invention is the provision of a drinking fountain for use of poultry which affords facilities for supporting a removable receptacle for holding a supply of liquid in position to be accessible to the poultry and so that liquid will be fed to the receptacle from a source of supply through the receptacle supporting means when the receptacle is in supported position and until a predetermined level of liquid in the receptacle has been reached, after which the flow of liquid to the receptacle will be stopped automatically.

A further object of the invention is the provision in a device of the character described of means for suspending a receptacle removably from a higher source of supply of liquid suitable for use of the poultry so that liquid will be fed to the receptacle when the receptacle is supported from the source of supply of liquid until a predetermined quantity of liquid has been placed in the receptacle or until the receptacle has been removed from position to be supported by said supporting means.

A further object of the invention is the provision in a device of the character described of means for removably supporting pan-shaped receptacles of various sizes within a considerable range.

A still further object of the invention is the provision in a fountain for the use of poultry of a receptacle for holding drinking water for the poultry so that relatively small chicks may drink from the receptacle without the possibility existing that the chicks might be drowned should they fall into the receptacle.

Other objects and advantages of the invention will be apparent from the following description, considered in conjunction with the accompanying drawings, in which:

Figure 1 is a view showing the improved poultry fountain, the receptacle and certain elements of the receptacle supporting and water supply means of the device being shown in vertical section and the remaining elements of the receptacle supporting means being shown in elevation, Figure 2 is a fragmentary sectional view taken substantially on the line 2—2 of Figure 1, Figure 3 is a perspective view of one of the members of a gripping or clamping device with which each of the opposite ends of the bail for removably supporting the receptacle of the device is provided.

The improved fountain comprises an open receptacle 1 for holding the supply of drinking water for the poultry. The receptacle 1 may be turned a pan. The receptacle or pan 1 is formed with an outwardly extending flange 2 at its upper end and preferably is formed with an internal upwardly facing annular shoulder 3 at a level adjacent to but below the level of the rim edge of the receptacle. A perforated plate or false bottom 4 fits within the upper part of the receptacle 1 and has the edge portion thereof supported by the shoulder 3. When the plate 4 is placed in the receptacle 1, it is intended that the level of liquid within the receptacle shall be slightly above the level of the plate 4 so that relatively small chicks may drink from the receptacle but will be prevented by the plate 4 from drowning should they fall into the receptacle.

In Figure 1, the numeral 5 designates a pendant pipe or other tubular conduit which is open at its lower end and is adapted in actual practice to convey drinking water or other liquid into the poultry yard or other place at which the invention is to be used. The invention contemplates the provision of an elastic hanger or suspension means for connecting the liquid supply pipe 5 with a bail 6 which has means at the ends of the arms 27 thereof whereby it may be detachably connected with diametrically opposite rim edge portions of the receptacle 1, and the receptacle 1 thus suspended from the liquid supply pipe 5 at a desirable level. The elastic hanger means comprises a tubular body 7 having the upper end portion thereof connected with the lower end portion of the liquid supply pipe 5 by means of a union 8 or in any other suitable known manner. A screw plug 9 having a central vertical passage 10 of relatively slight cross sectional area formed therethrough is secured in the upper end portion of the body 1 within the union 8 and is removable when the tubular body 7 has been disconnected from the union 8. A screw cap 11 is secured in place on the lower end portion of the tubular body 7 and of course is removable when desired. The screw cap 11 has a central opening 12 in the crown thereof. An elongated bushing 13 has external screw threads on the lower end portion thereof engaged with screw threads on the wall of the opening 12. The extreme lower end portion of the bushing 13 is formed to be non-circular in cross-sectional contour as indicated at 14 and can be gripped between the jaws of a wrench or like tool so that the bushing can be turned and the length of the portion of the bushing which extends within the bore of the tubular body 7 thus adjusted within a considerable range. A lock nut 15 is in threaded engagement with the bushing 13 below the head of the cap 11 and can be turned on the bushing to and from position to bear against the head of the cap 11 and thereby to lock the bushing to the cap.

The space within the tubular body 7 constitutes a valve chamber. The lower end portion of the plug 9 is formed with a depending central extension 16 surrounding the lower end portion of the passage 10 and having a flat bottom face adapted to serve as a valve seat for the upper face 17 of a valve 18. The valve 18 preferably is formed of soft rubber or other suitable compressible resilient material and has an axial socket 19 in its lower end. A valve stem 20 is shown as being a rod having a threaded upper end portion 21 fitting in the socket 19 of the valve 18. The lower end portion of the valve 18 surrounding the socket 19 is preferably convexly curved as shown to engage tightly with the upper edge of the bushing 13 when the valve 18 is at the limit of its downward movement in the bore of the tubular body 7. An expansion spring 22 encircles the bushing 13 within the tubular body 7 and bears at one end against the head of the cap 11 and at its opposite end against the valve 18, thus tending to urge the valve 18 upward to position to bear against the flat face of the depending central portion 16 of the plug 9.

The valve stem 20 is slidable in the bore of the bushing 13 and the lower end portion of said valve stem is formed as a hook 23.

The bail 6 preferably is reversely curved at 24 and 25 respectively at equal distances from the transverse median line of the bail, thus producing a relatively narrow inverted U-shaped attaching portion 26 which is located midway between the ends of the bail. This attaching portion 26 is adapted for engagement with the hook portion 23 of the valve stem 20.

The bail 6 has gripping devices at the ends thereof for engaging with rim portions of the receptacle 1. Each of such gripping devices comprises an end portion 27 of the bail. The extremity of each end portion of the bail is turned inwardly and downwardly at 28 to bear against the inner face of the upper end portion of the body of the receptacle 1 and thereby to serve as a clamping member or jaw for cooperating with a second clamping member or jaw 29 which is adjustably connected with the associated end portion 27 of the bail. The jaw member 29 has a hook portion 30 at its lower end adapted to engage under the rim flange 2 on the receptacle 1. This hook portion 30 is relatively wide as clearly shown in Figure 3. The shank of the jaw member 29 has the rearward end portion thereof arcuately curved transversely thereof so that the side edges 31 of the rearward end portion of the jaw member 29 straddle the associated end portions 27 of the bail and tend to prevent lateral displacement of the jaw member 29 from position on the bail when the jaw member 29 is connected with a laterally enlarged portion 32 of the associated end portion 27 of the bail by means of a bolt 33 having the shank thereof projected through aligned openings 34 and 35 in the jaw member 29 and the enlarged portion 32 of the associated end portion 27 of the bail, respectively. A nut 36 is in threaded engagement with the end portion of the shank of the bolt 33 and a washer 37 may be placed on the bolt 33 between the nut 6 and the associated end portions 27 of the bail.

From the foregoing description of the various parts of the device, the operation thereof may be readily understood. The bail 6 is made of spring wire or other material possessing considerable inherent resiliency, and therefore receptacles of various diameters can be connected with and detached from the clamping devices at the ends of the bail as desired. It is manifest that when the nuts 36 are tightened on the bolt, the contact portions of the jaws 28 and 29 will be forced toward each other and therefore can be adjusted relatively to each other to grip rim edge portions of receptacles which are inserted therebetween. Also, when the nuts 36 are loosened on the shanks of the bolts 33, the jaws or clamping members of the gripping devices at the ends of the bail can be detached from the rim edge portions of the receptacle and the receptacle can be removed for cleaning or for any other purpose. The bail and the receptacle can be removed as a unit from the hanger means of the device if desired. The strength of the spring 22 is sufficient to hold the valve 18 against the valve seat on the plug 9 when the weight of the receptacle 1 has been removed from the valve stem 20. However, as soon as the weight of the empty receptacle is imposed on the valve stem 20, the valve 18 will be moved downward against the action of the spring 22 a distance sufficient to permit liquid to pass from the bore 10 of the plug 9 into the space within the tubular body 7 and thence through the bushing 13 downward into the receptacle which is positioned therebelow. As the level of liquid in the receptacle 1 increases, the weight which must be sustained by the spring 22 also increases and as a result, the valve 18 moves slowly downward in the bore of the tubular body 7 as the level of liquid within the receptacle 1 rises. The bushing 13 is adjusted so that the length of the portion thereof which extends upwardly in the bore of the tubular body 7 is such that the lower end portion of the valve 8 will move against the upper edge of the bushing 13 when a desirable level of liquid in the receptacle 1 has been provided. This level can be varied by varying the length of the portion of the bushing 13 which extends upwardly within the bore of the tubular body 7. Of course, further flow of liquid through the bushing 13 from the space within the tubular body 7 is stopped when the valve 18 moves against the upper edge of the bushing 13 and a predetermined level of liquid thus will be automatically maintained in the receptacle 1. The bushing 13 and the plug 9 therefore may be termed spaced valve seat members having valve seats at the adjacent ends thereof for cooperating with the valve seat which is movable therebetween.

Obviously, my invention is susceptible of embodiment in forms other than that illustrated in the accompanying drawings, and I therefore consider as my own all such modifications and adaptations of the form of the device herein disclosed as fairly fall within the scope of the appended claims.

I claim:—

1. A liquid supply device comprising an open receptacle adapted to hold liquid, elastic hanger means for suspending said receptacle from a tubular liquid supply conduit, said hanger means including a stationary tubular member adapted for connection with said tubular supply conduit, a pair of spaced valve seats within said tubular hanger member, a movable hanger member adapted for connection with the receptacle and partially received within said tubular hanger member, and a valve carried by said movable hanger member, said valve being movable between said valve seats and being adapted when in engagement with either valve seat to prevent flow of liquid through said stationary hanger member.

2. A liquid supply device comprising an open receptacle adapted to hold liquid, elastic hanger means for suspending said receptacle from a tubular liquid supply conduit, said hanger means including a tubular member adapted for connection with said tubular supply conduit, and means within said tubular hanger member for preventing the flow of liquid through said tubular hanger member when said receptacle supports liquid of a given weight and when said receptacle has been detached from said hanger means, and for permitting flow of liquid through the tubular hanger member when the weight of the liquid within the receptacle has diminished from said given weight while the receptacle is supported by said hanger member.

3. In a liquid supply device, an elastic hanger unit comprising a tubular body, means for connecting the upper end portion of said tubular body with a pendant tubular source of liquid supply, a cap secured on the lower end portion of said tubular body, a pair of vertically spaced tubular valve seat members extending into said tubular body and having valve seats on the adjacent ends thereof, a valve disposed within said tubular body for movement between said valve seats, and means extending loosely through the bore of the lower valve seat member for operating said valve.

4. In a liquid supply device, an elastic hanger unit comprising a tubular body, means for connecting the upper end portion of said tubular body with a pendant tubular source of liquid supply, a cap secured on the lower end portion of said tubular body, a pair of vertically spaced tubular valve seat members extending into said tubular body and having valve seats on the adjacent ends thereof, a valve disposed within said tubular body for movement between said valve seats, an expansion spring acting on said valve to urge said valve to position to bear against said upper valve seat member, and a valve stem secured at its upper end to said valve and extending loosely through the bore of the lower valve seat member below said tubular body, the lower end portion of said valve stem being adapted for connection with an article which is to be supported thereon.

5. In a device of the character described, a hanger comprising a tubular body attachable at its upper end to a pendant open tubular liquid supply conduit, a cap secured on the lower end portion of said tubular body, said cap having a central opening in the head thereof, a plug secured in the upper end portion of said tubular body, said plug having a bore of relatively slight cross sectional area and having a valve seat surrounding said bore at the lower end of said plug, a bushing having the lower end portion adjustably engageable with the wall of opening of said cap, said casing extending within the bore of said tubular body in axial alignment with said plug, means for locking said bushing to said cap, the upper end of said bushing being formed to serve as a valve seat, a valve having an upper surface adapted to contact with the valve seat at the lower end of said plug and having a lower end portion adapted to contact with the valve seat at the upper end of said bushing, a valve stem extending loosely through said bushing and attached at its upper end to said valve for moving said valve downward to position to cooperate with the valve seat at the upper end of the bushing to prevent flow from the space within said tubular body through said bushing, and an expansion spring within the bore of said tubular body acting on the valve to urge said valve to position to contact with the valve seat at the lower end of said plug to prevent flow from the bore of said plug into the bore of said tubular body, said valve stem having an attaching element at the lower end thereof.

MARK W. HEATHERINGTON.